(12) United States Patent
Zhang et al.

(10) Patent No.: US 9,513,437 B2
(45) Date of Patent: Dec. 6, 2016

(54) PHOTONIC INTEGRATED CIRCUIT INCORPORATING A BANDGAP TEMPERATURE SENSOR

(71) Applicant: Coriant Advanced Technology, LLC, New York, NY (US)

(72) Inventors: Yi Zhang, Elkton, DE (US); Shuyu Yang, Newark, DE (US); Kishore Padmaraju, New York, NY (US); Michael J. Hochberg, New York, NY (US)

(73) Assignee: Coriant Advanced Technology, LLC, New, NY (US)

( * ) Notice: Subject to any disclaimer, the term of this patent is extended or adjusted under 35 U.S.C. 154(b) by 0 days.

(21) Appl. No.: 14/931,076

(22) Filed: Nov. 3, 2015

(65) Prior Publication Data

US 2016/0124251 A1    May 5, 2016

Related U.S. Application Data

(60) Provisional application No. 62/075,763, filed on Nov. 5, 2014.

(51) Int. Cl.
| | |
|---|---|
| G02F 1/225 | (2006.01) |
| G02B 6/26 | (2006.01) |
| G02B 6/134 | (2006.01) |
| G02B 6/122 | (2006.01) |
| G02B 6/12 | (2006.01) |

(52) U.S. Cl.
CPC .............. *G02B 6/134* (2013.01); *G02B 6/1225* (2013.01); *G02F 1/2257* (2013.01); *G02B 2006/12135* (2013.01); *G02B 2006/12138* (2013.01); *G02B 2006/12159* (2013.01); *G02F 2202/32* (2013.01)

(58) Field of Classification Search
CPC ................. G02F 1/0147; G02F 1/2257; G02B 2006/12135
See application file for complete search history.

(56) References Cited

U.S. PATENT DOCUMENTS

| | | | | |
|---|---|---|---|---|
| 5,546,041 A | * | 8/1996 | Szajda | .................... H03F 3/082 307/650 |
| 6,101,210 A | | 8/2000 | Bestwick | |
| 6,415,066 B1 | * | 7/2002 | Harpin | .................... G02B 6/122 385/130 |
| 7,447,395 B2 | * | 11/2008 | Montgomery | .......... G02F 1/225 385/14 |

(Continued)

OTHER PUBLICATIONS

International Search Report, PCT/US2015/058867, 4 pages, date of mailing Feb. 12, 2016.

(Continued)

*Primary Examiner* — Omar R Rojas
(74) *Attorney, Agent, or Firm* — Nixon Peabody LLP

(57) ABSTRACT

An optical device that includes means for thermal stabilization and control is described. The optical device can be a ring resonator, or another device that requires accurate control of the phase of the optical signal. In an example involving an optical resonator, a thermal stabilization system includes a temperature sensor, a control circuit, and a heater local to the resonator. The temperature sensor can be a bandgap temperature sensor formed of a pair of matched p/n junctions biased in operation at different junction currents.

16 Claims, 17 Drawing Sheets

(56) References Cited

U.S. PATENT DOCUMENTS

| | | |
|---|---|---|
| 2003/0025976 A1 | 2/2003 | Wipiejewski |
| 2003/0057428 A1 | 3/2003 | Day |
| 2004/0200962 A1 | 10/2004 | Ishikawa |
| 2012/0057079 A1 | 3/2012 | Dallesasse |
| 2012/0062974 A1 | 3/2012 | Manipatruni |

OTHER PUBLICATIONS

Written Opinion, PCT/US2015/058867, 6 pages, date of mailing Feb. 12, 2016.
Padmaraju et al., "Resolving the Thermal Challenges for Silicon Microring Resonator Devices," 2013 Science Wise Publishing & DE Gruyter, download date Oct. 3, 2013, (14 pages).
DeRose et al., "Silicon Microring Modulator with Integrated Heater and Temperature Sensor for Thermal Control," IEEE OSA/CLEO/QELS 2010978-1-55752-890-2/10, (2 pages), May 2010.
Yang et al., "Thermal Stabilization of a Microring Resonator Using Bandgap Temperature Sensor," 2015 IEEE, 978-1-4799-8179-3/15, (2 pages)., Apr. 2015.

* cited by examiner

PHOTONIC INTEGRATED CIRCUIT INCORPORATING A BANDGAP TEMPERATURE SENSOR

CROSS-REFERENCE TO RELATED APPLICATIONS

This application claims the benefit of U.S. Provisional Application No. 62/075,763, filed Nov. 5, 2014, which is hereby incorporated by reference herein in its entirety.

TECHNICAL FIELD

The present invention generally relates to photonic integrated circuits, and more particularly relates to photonic integrated circuits with an integrated temperature sensor based on dual p/n junctions, and methods for fabrication and operation thereof.

BACKGROUND

Photonic integrated circuits (PICs) with optical waveguides having a semiconductor core, such as for example PICs based on Silicon-on-Isolator (SOI) technology, have several advantages over photonic circuits using all-dielectric waveguides. These advantages stem at least in part from the possibility of using well-developed semiconductor fabrication processes and technologies for electronic control of various properties of the waveguide material, including its refractive index and absorption coefficient. Furthermore, the refractive index of many conventional semiconductor materials may be considerably higher than that of typical dielectric materials conventionally used in optical waveguides, which enables fabricating high-index-contrast waveguides that allow for tighter waveguide bends, thereby making the optical circuits smaller. For example, functional micro-ring resonators with the radius as small as 2-3 microns (μm) have been fabricated using the SOI technology. Such micro-resonators may be useful for many applications, including high-speed modulation of light signals, wavelength filtering and multiplexing, and sensing. However, semiconductor materials that are typically used in optical waveguides, including silicon (Si), may have a relatively high thermo-optic coefficient, i.e. the rate of change of the refractive index with temperature, which may lead to sensitivity to environmental temperature variations or to operation-related thermal perturbations. Photonic circuits that require accurate control of the phase of the optical beam, such as those including micro-ring resonators and other optical elements relying on optical interference effects, may be particularly sensitive to temperature variation. For example, in the 1.5 μm wavelength range typical for telecom applications, the thermo-optic coefficient of silicon (Si)) is about $1.8 \times 10^{-4}$ $K^{-1}$, which is approximately an order of magnitude higher than that of the silicon dioxide (SiO2); as a result, the resonant wavelength of a silicon micro-ring can drift by 70-80 picometer (pm) per degree K temperature change in the telecom wavelength range, making such devices extremely vulnerable to thermal perturbations.

There is a need for semiconductor-based photonic integrated circuit devices that have improved stability and/or control with regard to thermal perturbations.

SUMMARY

Accordingly, an aspect of the present disclosure is directed to system, method, and device for thermally managing a semiconductor photonic integrated circuit (PIC) using an integrated bandgap temperature sensor that is comprised of two p/n junctions, which may be integrated within an optical layer of the PIC.

One aspect of the disclosure provides a device comprising a semiconductor PIC, the PIC comprising an integrated optical device, and a temperature sensor in thermal communication with the integrated optical device, wherein the temperature sensor comprises first and second p/n junctions configured for producing at least one electrical signal that is indicative of a temperature of the PIC. According to a feature of the present disclosure, the first and second p/n junctions may be configured to have matching current density versus voltage characteristics.

One aspect of the disclosure provides a device comprising a semiconductor PIC, the PIC comprising at least one optical waveguide, and a temperature sensor in thermal communication with the at least one optical waveguide, wherein the temperature sensor comprises first and second p/n junctions configured for producing at least one electrical signal that is indicative of a temperature of the PIC.

In accordance with one aspect of the disclosure, the device may comprise a substrate including a dielectric layer, wherein the semiconductor PIC comprises a patterned semiconductor layer disposed over the dielectric layer, the patterned semiconductor layer defining the at least one optical waveguide and the first and second p/n junctions, wherein each of the first and second p/n junctions are planar p/n junctions defined in the patterned semiconductor layer and configured to have substantially identical current density vs. voltage characteristics at a same temperature.

An aspect of the present disclosure provides a device comprising a semiconductor PIC, the PIC comprising an integrated optical device, and a temperature sensor in thermal communication with the integrated optical device, wherein the temperature sensor comprises first and second p/n junctions configured for producing at least one electrical signal that is indicative of a temperature of the optical waveguide, the device further comprising a temperature control element in thermal communication with the at least one optical waveguide, the temperature control element configured to adjust a temperature of the at least one optical waveguide responsive to an electrical temperature control signal. A control circuit may further be provided in electrical communication with each of the temperature sensor and the temperature control element, the control circuit configured to drive the temperature control element in dependence upon the differential voltage signal obtained from the temperature sensor.

One aspect of the present disclosure provides a method of fabricating a photonic integrated circuit (PIC), comprising:

a) patterning a semiconductor layer on a substrate to define at least one optical waveguide;

b) forming, in the semiconductor layer, an integrated temperature sensor in a thermal communication with the at least one optical waveguide using a process comprising:

c) selectively doping the semiconductor layer to define first and second doped regions of a first carrier polarity;

d) selectively doping the semiconductor layer in areas adjacent to the first and second doped regions to define third and fourth doped regions of a second polarity that is opposite to the first polarity, and so as to define first and second p/n junctions that in one embodiment may have matching current density versus voltage characteristics; and, e) forming electrical contacts to the first and second p/n junctions so that said p/n junctions share a common electrical connection at one of correspondingly doped sides thereof, wherein the electrical contacts are configured to direct a first electrical current through the first p/n junction, and to direct a second electrical current through the second p/n junction. In one embodiment step e) may comprise forming an electrical connection between either p-doped regions of the first and second p/n junctions or n-doped regions of the first and second p/n junctions.

One aspect of the present disclosure is directed to thermally stabilizing and/or wavelength tuning an optical micro-ring resonator formed in a Silicon-on-Isolator (SOI) chip. An integrated bandgap temperature sensor is provided that is comprised of two planar p/n junctions, which may be formed in the same silicon layer as the optical micro-ring resonator. In operation the p/n junctions may be driven at different electrical current densities, and a differential voltage across the p/n junctions may be used as an indication of the resonator temperature. An integrated electrical heating element may be employed to adjust the resonator temperature based on the differential voltage across the p/n junctions so as to position a spectral resonance of the micro-ring resonator at a desired wavelength and/or to thermally stabilize the micro-ring resonator against changes in environmental temperature.

BRIEF DESCRIPTION OF THE DRAWINGS

Embodiments disclosed herein will be described in greater detail with reference to the accompanying drawings, which are not to scale and in which like elements are indicated with like reference numerals, and wherein.

DETAILED DESCRIPTION

Figure 1:
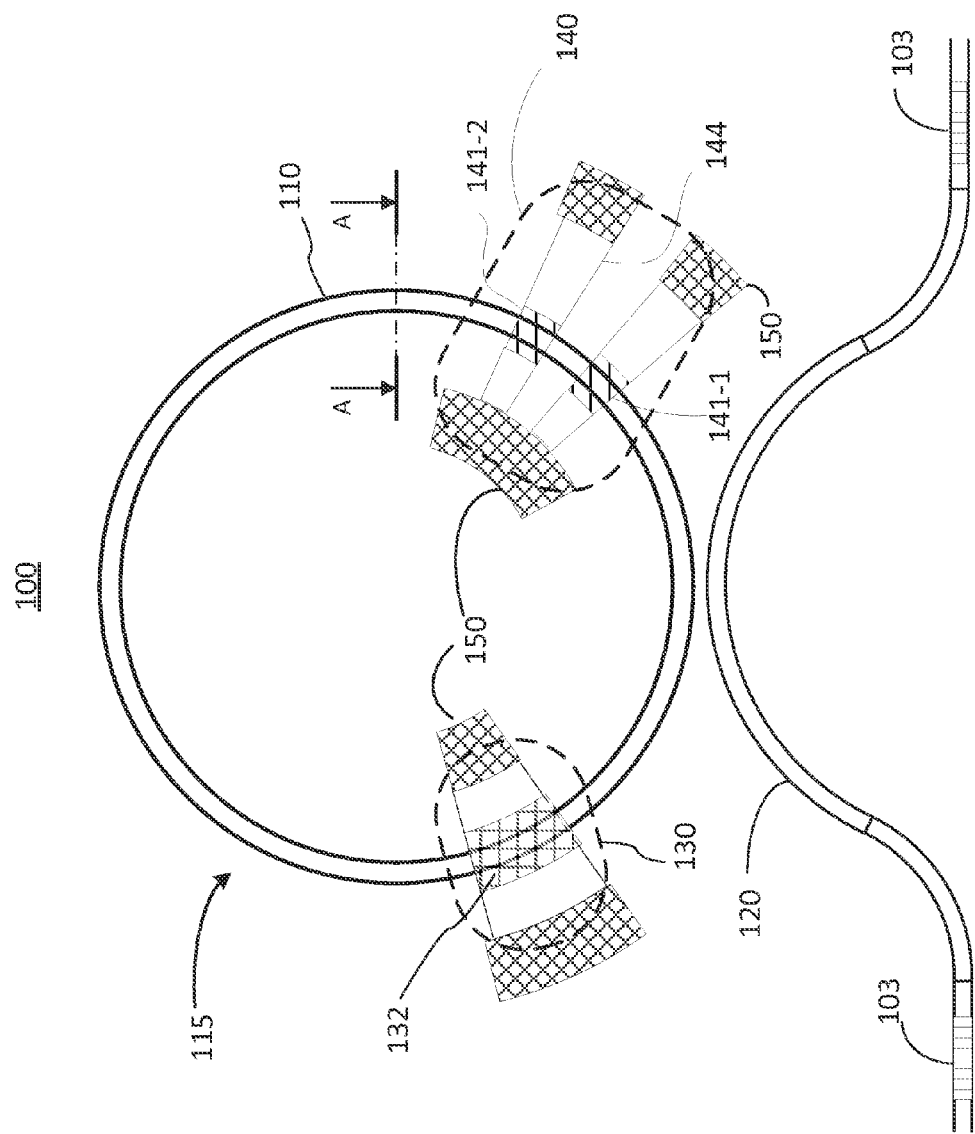
FIG. 1 is a schematic plan view diagram of a photonic integrated circuit (PIC) including an optical bus waveguide coupled to a micro-ring waveguide resonator with an integrated bandgap temperature sensor formed with two matched planar p/n junctions.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The terms 'photonic integrated circuit', or PIC, and 'integrated lightwave circuit' may be used herein interchangeably. The term "optical waveguide" is used herein to refer to any optical element or structure that provides optical confinement in at least one dimension and wherein light of a target wavelength or wavelengths can propagate.

Example embodiments disclosed herein may relate to thermal stabilization and wavelength control of photonic integrated circuits (PICs), in particular those that utilize optical waveguides with semiconductor cores or defined in a layer of semiconductor material, termed optical layer, and to semiconductor-based PIC chips that incorporate features enabling such stabilization and control. Using active temperature control and a pair of p/n junctions integrated with the optical layer as a bandgap reference sensor providing low-noise linear measurements of chip temperature, or of a temperature of a particular optical device defined within the optical layer, PIC based devices requiring accurate control of the optical phase can be made to successfully operate in practical environments, and/or to be controllably set to a desired wavelength within an operating wavelength range. In other embodiments, the integrated bandgap reference sensor disclosed herein may provide a device temperature reference in the absence of active temperature control. Advantageously, the use of a bandgap reference sensor to generate feedback for device stabilization doesn't rely on specific device functionality and operating condition and may be utilized universally in a variety of devices with differing functionalities.

Figure 2:
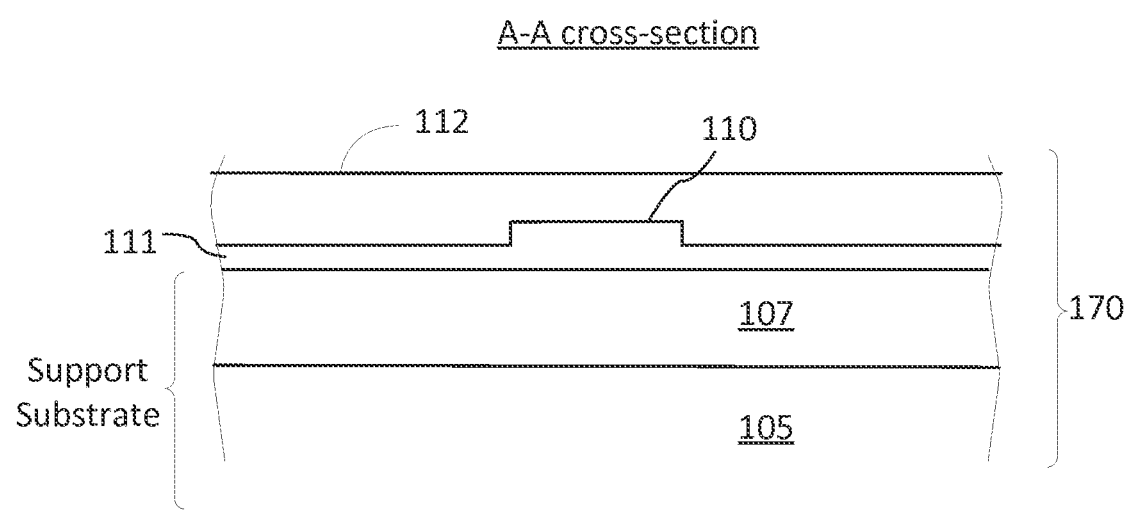
FIG. 2 is a partial cross-section view of the micro-ring waveguide of FIG. 1.

Referring first to FIG. 1, there is illustrated in plan view an example PIC 100 including an optical waveguide 110 configured to form a micro-ring resonator 115 which is coupled to a bus optical waveguide 120. The micro-ring resonator 115 is an example of an optical device which may be integrated in a PIC and which may require accurate control of the optical phase; it may also be referred to herein simply as the micro-ring 115, and the optical waveguide 110 may also be referred to herein as the micro-ring waveguide 110 or simply as the waveguide 110. FIG. 2 illustrates a cross-section of a portion of the PIC 100 taken across the micro-ring waveguide 110 as indicated by the A-A line in FIG. 1. The optical waveguide 110 may be fabricated by patterning a semiconductor layer 111 disposed over a top dielectric layer 107 of a support substrate. The micro-ring waveguide 110 may be for example a ridge waveguide or a rib waveguide formed in the semiconductor layer 111. In one embodiment the semiconductor layer 111 may be a silicon (Si) layer of a SOI wafer or chip 170, which further includes a silicon substrate 105 with the dielectric layer 107 of silicon dioxide (SiO2) disposed over it. The SiO2 layer 107 serves as the bottom cladding layer of the micro-ring waveguide 110. A layer 112 of a suitable electrically isolating material of a lower index of refraction, such as for example SiO2 or silicon nitride (Si3N4), may optionally be deposited over the silicon layer 111, forming the top cladding layer of the optical waveguide 110. It will be appreciated that other semiconductor-based material systems may also be used to implement PIC 100, so that for example layer 111 may be a layer of another semiconductor material that is substantially transparent in the wavelength range of interest for a target application, including but not limited to GaAs, InP, GaN, and their alloys and compounds, which may be disposed over a non-conducting layer of a lower index of refraction supported by a suitable substrate.

Due to the high refractive index of silicon as compared to the refractive index of silicon dioxide, the micro-ring waveguide 110 may be a high-index-contrast waveguide allowing for low-loss small-radius bends. High-index silicon waveguides of that type are described, for example, in U.S. Pat. No. 7,200,308, which is incorporated herein by reference.

By way of example, the optical waveguide 110 may have a width of about 500 nm and a height of about 220 nm, enabling a single-mode operation at a wavelength of 1550 nm. Further by way of example, the thickness of the Si layer 111 adjacent to the ridge may be about 100-120 nm. Typical radius of the micro-ring 110 may be for example, in the range of 5-50 μm, but may be also outside of this range, for example as small as 2 μm. It will be appreciated that all these parameters may vary outside of the stated exemplary ranges, depending on a particular application, target wavelength range, and used materials. The bus waveguide 120 may have a same or similar cross-sectional structure to that shown in FIG. 2; it may also change in cross-section along the waveguide, for example to optimize both input optical coupling and optical coupling with the ring waveguide. The bus-coupled micro-ring resonator of the type illustrated in FIG. 1 may be used in a variety of practical application, including but not limited to as a light modulator, optical multiplexer/demultiplexer, and for environmental sensing, in particular when used in conjunction with a suitable material of the top cladding layer 112 which optical properties are sensitive to an environmental agent of interest.

In operation light may be injected into the bus waveguide 120 using input/output optical ports 103, which for example may be embodied using optical gratings as known in the art, and may propagate along the bus waveguide 120 passing the micro-ring resonator 115. Light of resonant wavelengths propagating along the bus waveguide 120 may couple into the micro-ring waveguide 110 and circulate there multiple times. Silicon micro-rings with radius as small as 2 μm may be robust against fabrication non-uniformities, have low loss and a Q of 2,000-20,000 or greater, resulting in deep and sharp dips or notches in a light transmission characteristic at resonant wavelengths of the micro-ring. The resonant wavelengths can be lithographically controlled to within a standard deviation of a few nm typically. However, even this variation may still be too large for many practical applications, so that an ability to tune the resonance wavelengths of the micro-ring may be desired.

Figure 3:
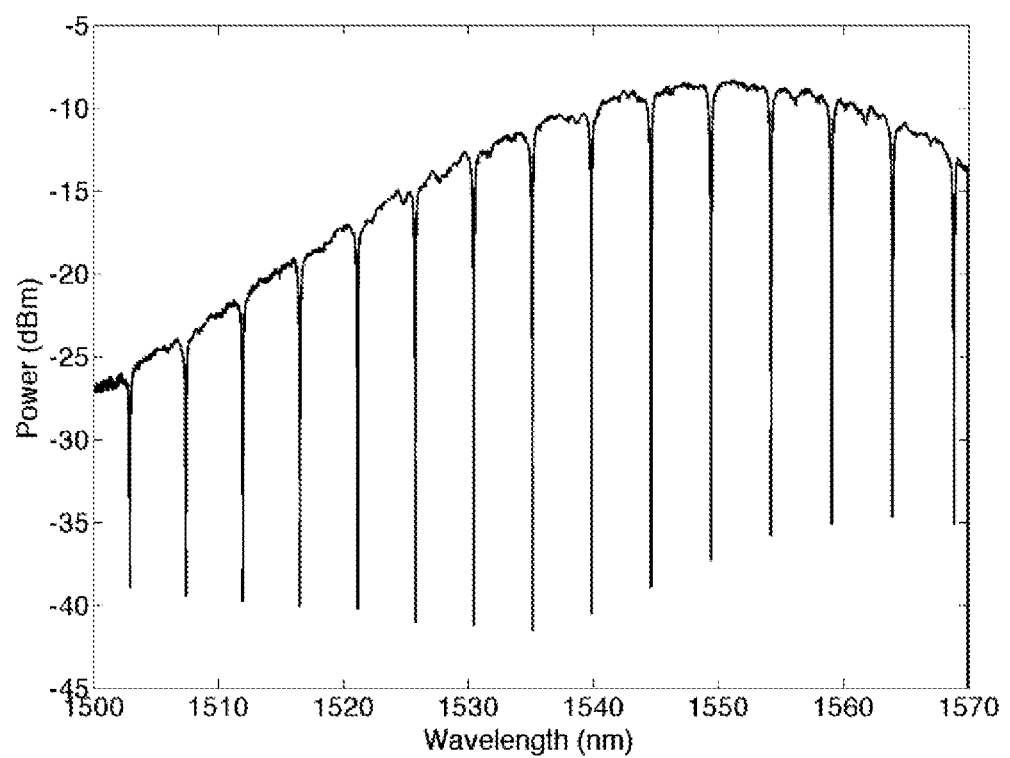
FIG. 3 is a graph illustrating micro-ring resonances in a transmission power spectrum of the PIC of FIG. 1 at 25° C.

An example transmission characteristic through a bus waveguide 120 coupled to a micro-ring 110 is illustrated in FIG. 3; in this example embodiment, the micro-ring radius is 20 μm, with a 300 nm edge-to-edge gap between the bus waveguide 120 and ring waveguide 110, and 2 μm straight coupling length. The ring circumference leads to a free spectral range (FSR) for the micro-ring of 4.75 nm. Measured extinction ratio in this example is greater than 30 dB, indicating that critical coupling is achieved.

The sharp features of the spectral transmission characteristic of the bus-coupled micro-ring resonator such as that illustrated in FIG. 1 makes it efficient in many practical applications, including but not limited to as a broadband optical modulator; however, the sharp micro-ring resonances also make the PIC 100 very sensitive to temperature changes, with the temperature sensitivity made worse by a relatively high thermo-optic coefficient of the waveguide core typical for semiconductors. The resonant wavelength of the micro-ring resonator 115 drifts as temperature changes. The drift of the resonant wavelength of the micro-ring 110 as a function of temperature change can be estimated using the following expression:

$$\frac{d\lambda}{dT} = \frac{\partial n_{eff}}{\partial T} \frac{\lambda}{n_g} \quad (1)$$

where $n_g$ is the group index of the waveguide, and $n_{eff}$ is the effective refractive index of the waveguide. For a high index contrast silicon waveguide wherein the optical mode is tightly confined in the silicon core and the thermo-optic coefficient of $SiO_2$ cladding is an order of magnitude smaller than that of silicon, the contribution from the oxide cladding can be neglected, and Eq. (1) can be approximated by $$\frac{d\lambda}{dT} = \frac{\partial n_{Si}}{\partial T}\frac{\lambda}{n_g} = 1.8 \times 10^{-4}\frac{\lambda}{n_g} \quad (2)$$

Figures 13A, 13B:
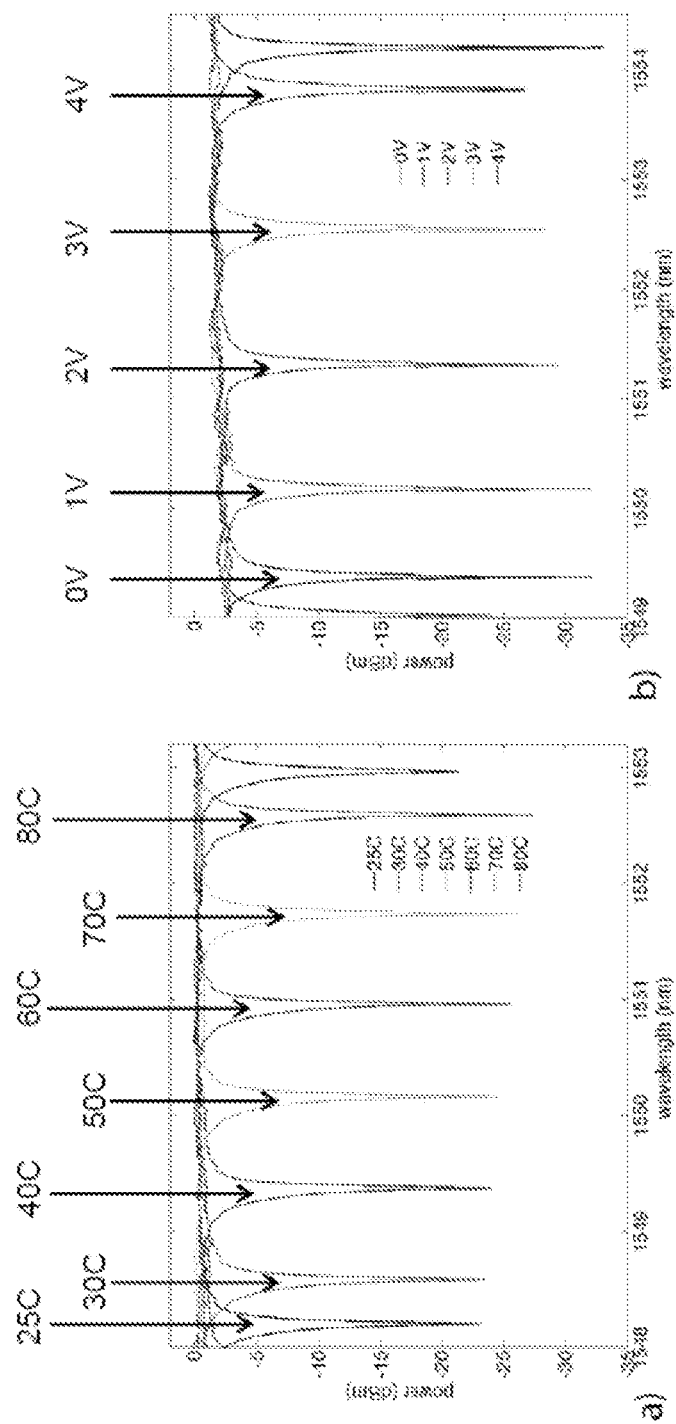
FIG. 13(A) is a graph illustrating the thermal shift of a spectral resonance of the micro-ring resonator versus wafer chuck temperature.
FIG. 13(B) is a graph illustrating the shift of the spectral resonance of the micro-ring resonator versus heater voltage.

For an example single mode submicron silicon waveguide of size 500 nm×220 nm, the group index $n_g$ of silicon near 1550 nm wavelength is about 4. For a single degree (° C.) temperature change, the resonant wavelengths of the micro-ring resonator in the 1550 nm wavelength range may drift by about 0.07-0.08 nm. This wavelength shift is comparable to the full width at half max (FWHM) of a transmission resonance of an example micro-ring 110 having a radius of 10 μm, an FSR of 8.7 nm, and FWHM of 0.075 nm, corresponding to Q of 20 000. FIG. 13(A) illustrates the thermal sensitivity of a spectral resonance of a test silicon micro-ring device measured in a temperature range from 25° C. to 80° C. The resonance peak is shifted by 4.38 nm, from 1548.203 nm to 1552.592 nm over the 55° C. temperature range, corresponding to a resonance wavelength sensitivity of about 0.08 nm/K, which is close to the estimated value 0.07 nm/K.

Although the sensitivity of silicon micro-ring resonators to temperature changes may be exploited in temperature sensing applications, it may be detrimental in telecom and other applications where the device may be required to stably operate over a wide temperature range. For example, an operating temperature range for optical devices in certain applications may span as much as 80° C., such as from −5° C. to 75° C. The resonant wavelengths of the silicon micro-ring 110 can change over this operating temperature range by as much as 6 nm. The sensitivity to temperature could lead to a serious vulnerability of optical devices incorporating silicon micro-resonators or other semiconductor-based resonant and phase-sensitive PICs in practical environments.

The operation of a temperature-sensitive PIC may be stabilized with respect to environmental and operation-related temperature variations by employing an active feedback control of the PIC temperature using a temperature controller, such as a heater or a thermo-electric cooler (TEC), and a temperature or performance sensor as a source of the feedback signal. The term 'performance sensing' is used herein to refer to feedback approaches that rely on measurements of a device performance parameter other than temperature that however is sensitive to temperature; examples of such parameters include optical power, e.g. either within the micro-resonator or at the output, and the bit error rate (BER) when the micro-ring is used as a data modulator. Direct temperature sensing may have advantages over indirect feedback approaches relying on performance sensing, as it should be generally application-invariant and less dependent on variable factors other than temperature that may affect device performance parameters.

Referring again to FIG. 1, in one embodiment PIC 100 may include a temperature sensor 140 and a temperature control element 130, with the temperature control element 130 embodied in the form of a heater using a resistive heating element 132. In another embodiment, the temperature control element 130 may be omitted, or embodied using a TEC. The temperature sensor 140 includes first and second p/n junctions 141-1 and 141-2, which may be generally referred to herein as p/n junctions 141. The temperature sensor 140 may also be referred to as the bandgap temperature sensor of the bandgap reference sensor 140. Contact areas or pads 150 may be provided for electrically connecting the two p/n junctions 141 of the temperature sensor 140, and separately the heating element 132 to external electrical circuitry, examples of which are described hereinbelow. Electrical contacts to the contact areas 141 may be provided, for example, through vias or openings in the cladding layer 112, or in any other suitable way. Suitably doped regions 144 of the Si layer may provide separate in-plane electrical connections from the p/n junctions 141 to the respective contact pads 150. In one embodiment, a p-doped or n-doped region of the first p/n junction 141-1 may have a direct low-resistance ohmic electrical connection to a correspondingly doped region of the second p/n junction 141-2, which may be integrated with the Si layer 111. In one embodiment, the p-doped and n-doped regions forming the first and second p/n junctions 141 may be configured so that the first and second p/n junctions 141-1 and 141-2 have substantially identical, i.e. matching, current density vs. voltage characteristics V(J). In one embodiment, the p-doped and n-doped regions forming the first and second p/n junctions 141 may be configured so that the first and second p/n junctions 141-1 and 141-2 have substantially identical, i.e. matching, current vs. voltage characteristics V(I). In one embodiment, one of the p-doped or n-doped regions of the first and second p/n junctions 141 may share a same ground electrical connector or pin.

Figure 4:
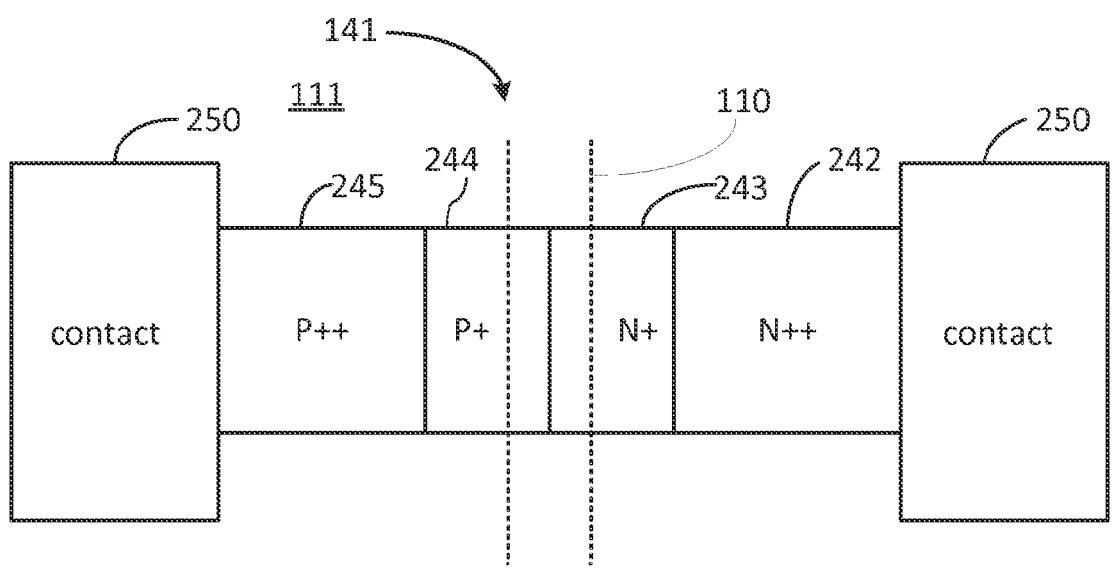
FIG. 4 is a schematic plan view of one example embodiment of a planar p/n junction of the integrated bandgap temperature sensor.

In one embodiment the p/n junctions 141 are planar p/n junctions that are configured for temperature sensing. In one embodiment they may be configured for producing a differential voltage signal that is indicative of a temperature of the optical waveguide 110 as described more in detail hereinbelow. Referring to FIG. 4, each of the planar p/n junctions 141 may be formed by adjoining p doped and n doped regions or areas of the semiconductor layer 111, which are indicated in FIG. 4 as p+ region 244 and n+ region 243, respectively. Electrical connections to the p/n junctions 141 may be provided by more heavily doped p++ conducting region 245 and n++ conducting region 242 abutting upon opposing sides of the p+ and n+ regions 244, 243, respectively. Contact pads 250 in ohmic contact with the p++ and n++ regions may further be provided to facilitate wiring. It will be appreciated that the n-doped and p-doped regions 241-244 may be formed using well-developed in the art technologies, such as for example by selective diffusion or ion implantation of suitable dopants. By way of example, the p+ region 244 and p++ region 245 may be formed by selectively doping the Si layer 111 with boron (B) to a doping concentration in the range of about $10^{18}$-$10^{19}$ cm$^{-3}$ for the p+ region and $5 \cdot 10^{18}$-$10^{20}$ cm$^3$ for the p++ region, respectively. The n+ region 243 and n++ region 242 may be formed by selectively doping the Si layer 111 with phosphorus (Ph) to a doping concentration in the range of about $10^{18}$-$10^{19}$ cm$^{-3}$ for the n+ region and $5 \cdot 10^{18}$-$10^{20}$ cm$^{-3}$ for the n++ region, respectively. It will be appreciated that other dopant materials and/or other doping levels may also be used.

The operation of p/n junctions 141 for temperature sensing may be understood as follows. As known in the art, the current density J through a p/n junction may be approximately described by the following equation (3):

$$J = J_0\left(e^{\frac{qV}{nkT}} - 1\right) \qquad (3)$$

where $J_0$ is the magnitude of the saturation current density, q is the fundamental electric charge, V is applied voltage, k is Boltzmann constant, n is the junction ideality factor, and T is absolute temperature. Although the junction current density J does depend on temperature, it also depends on other factors that define the saturation current density $J_0$, such as junction size, doping concentration, generation and recombination rates in the junction, etc. However, it may be shown that the difference of voltages across two matched p/n junctions that are biased at different current density depends primarily only on temperature, and vary proportionally therewith. Here, the term 'matched p/n junctions' refers to two p/n junctions that have substantially identical geometry and material parameters, including matching doping profiles and layer thickness, but may have a different width across the p and n regions along the junction. Two matched p/n junctions have substantially equal saturation current densities $J_0$ and therefore matching V(J) characteristic, i.e. the dependence of the voltage V across the p/n junction on the current density J through the junction. Two matched p/n junctions of the same width may have substantially identical V(I) characteristic, i.e. the dependence of the voltage V on the electrical current I through the junction. Suitably matching p/n junctions may be fabricated in a same semiconductor layer using modern semiconductor micro-fabrication technologies, in particular when they are placed close to each other.

The difference in voltages $\Delta V$ across two matched p/n junctions that are biased with two different electrical current densities is termed here 'differential voltage', and is proportional to the absolute temperature T of the p/n junctions. For two matched p/n junctions of the same width that are biased with electrical currents $I_1$ and $I_2$ and have the same temperature T, the differential voltage $\Delta V$ may be estimated based on the following equation (4):

$$\Delta V = \frac{kT}{q}\ln\left(\frac{I_1}{I_2}\right). \qquad (4)$$

For two matched p/n junctions of different width $w_1$ and $w_2$, the ratio of currents in equation (4) should be replaced by the ratio of current densities, which amounts to an additional temperature-independent factor $(w_2/w_1)$ under the logarithm in equation (4).

The temperature T of the p/n junctions 141 having matching V(I) or V(J) characteristics may therefore be accurately estimated based on equation (4) from a known ratio of the electrical currents or current densities flowing through the two p/n junctions by measuring the differential voltage $\Delta V$ across the two p/n junctions. A proportionality coefficient between the differential voltage $\Delta V$ and the temperature T may also be determined for each particular device and temperature sensor at a calibration stage.

Figure 5:
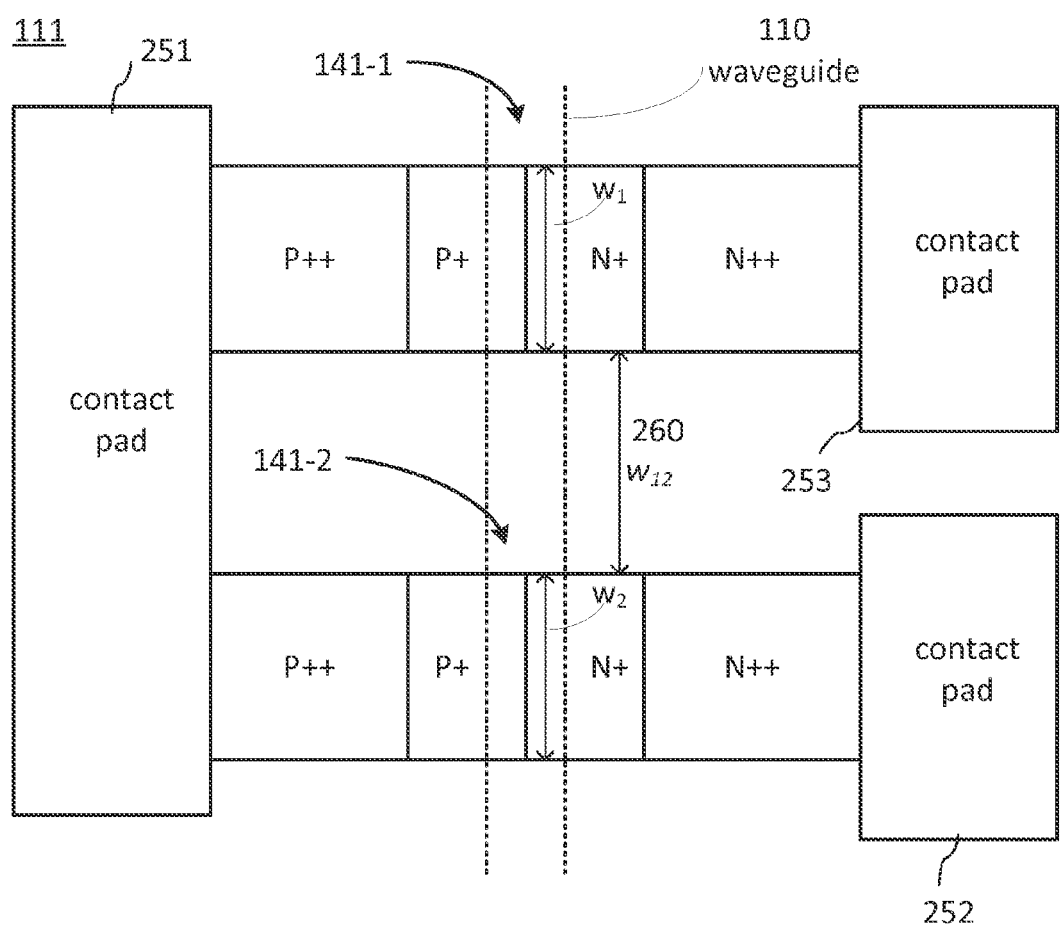
FIG. 5 is a schematic plan view of an example embodiment of the integrated bandgap temperature sensor based on a pair of matched p/n junctions.

Referring to FIG. 5, there is illustrated an embodiment of the temperature sensor 140 which is comprised of two planar p/n junctions of the type illustrated in FIG. 4 that are formed in the Si layer 111 next to each other. The first and second p/n junctions 141-1 and 141-2 have a common ohmic electrical connection 251 at one side thereof, and have two separate electrical connections 252, 253 at the opposite sides of the junctions, so as to enable separate biasing of the two p/n junctions, as described hereinbelow. In the illustrated embodiment, the p-doped regions of the p/n junctions 141-1 and 141-2 share a same electrical contact area 251, and connect at their n-doped sides to two different electrical contacts 252, 253. In another embodiment, the p/n junctions 141-1 and 142-2 may share an electrical contact at their n-doped sides, with two separate electrical connections at the p-sides thereof. In one embodiment, the p/n junctions 14-1 and 141-2 may be electrically separate from each other on the chip. In one embodiment corresponding p+ and n+ regions forming the first and second p/n junctions 141-1, 141-2 may be configured to have substantially identical doping profiles so that these p/n junctions have matching current density vs. voltage characteristics V(J). In one embodiment the first and second p/n junctions 141-1, 141-2 may be configured also to have substantially equal widths, so that these p/n junctions have substantially identical current vs. voltage characteristics V(I). By way of example, each of the p/n junctions 141-1 and 141-2 may have a width in the range of 0.5 μm to 10 μm.

Figure 6:
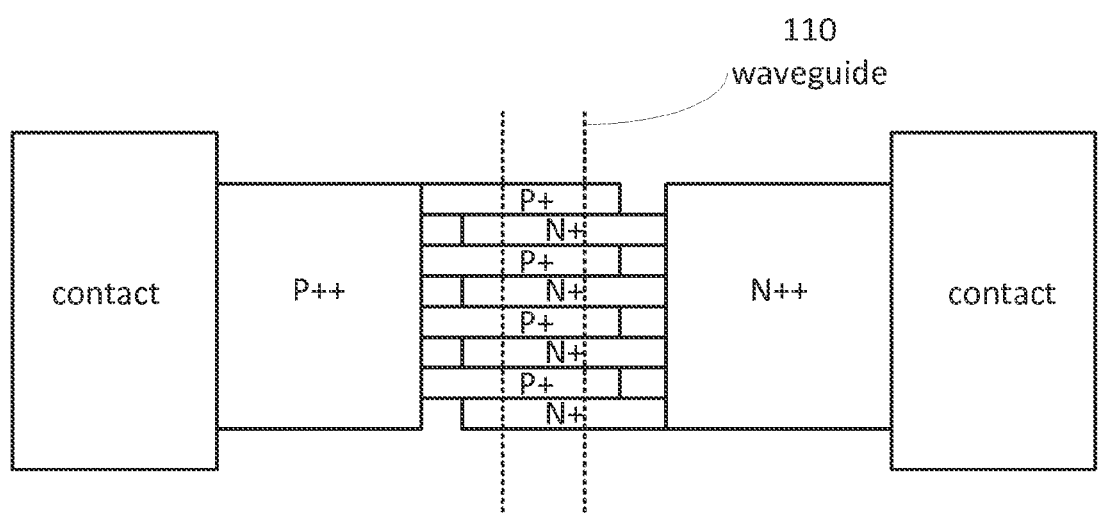
FIG. 6 is a schematic plan view of an example embodiment of a planar p/n junction with interdigitated p- and n-doped regions.

In the embodiment illustrated in FIGS. 4 and 5 the p-doped and n-doped regions forming the p/n junctions 141 meet along the micro-ring waveguide 110 in a middle portion thereof however other positioning and orientations of the p/n junctions 141 relative to the micro-ring optical waveguide 110 and each other are also possible. For example, embodiments may be envisioned wherein one or both of the p/n junctions 141 may be oriented at a non-zero angle to the optical waveguide, including being orthogonal thereto. FIG. 6 illustrates another example configuration of the p/n junction 141 that includes a plurality of interdigitated p+ and n+ regions which are formed in the Si layer 111 next to each other, and which may extend across the width of the waveguide 110.

It may be preferable that the first and second p/n junctions 141-1, 141-2 are formed close to each other, which may help to ensure that they operate at the same temperature and to minimize the effect of possible spatial variability of the semiconductor optical layer 111 characteristics across the wafer. For example, in one embodiment the distance $w_{12}$ between the first and second p/n junctions 141-1 and 141-2, i.e. the width of the inter-junction gap 260, may be about or less than 2 μm, or about or less than 1 μm. In one embodiment, the silicon layer 111 in the gap 260 between the p/n junctions may be removed, e.g. etched down to the oxide layer 107, to prevent or suppress shunt currents that may otherwise be flowing through the gap 260 between the p/n junctions 141 and/or the between the electrical contacts 251, 253. The suppression of shunt currents may also be accomplished by p-doping of the silicon layer 111 within the inter junction gap 260, which may enable reducing the gap width $w_{12}$ to ~0.5 μm. However embodiments wherein the two p/n junctions of the temperature sensor 140 are separated by more than 2 μm may also be envisioned.

Figure 7:
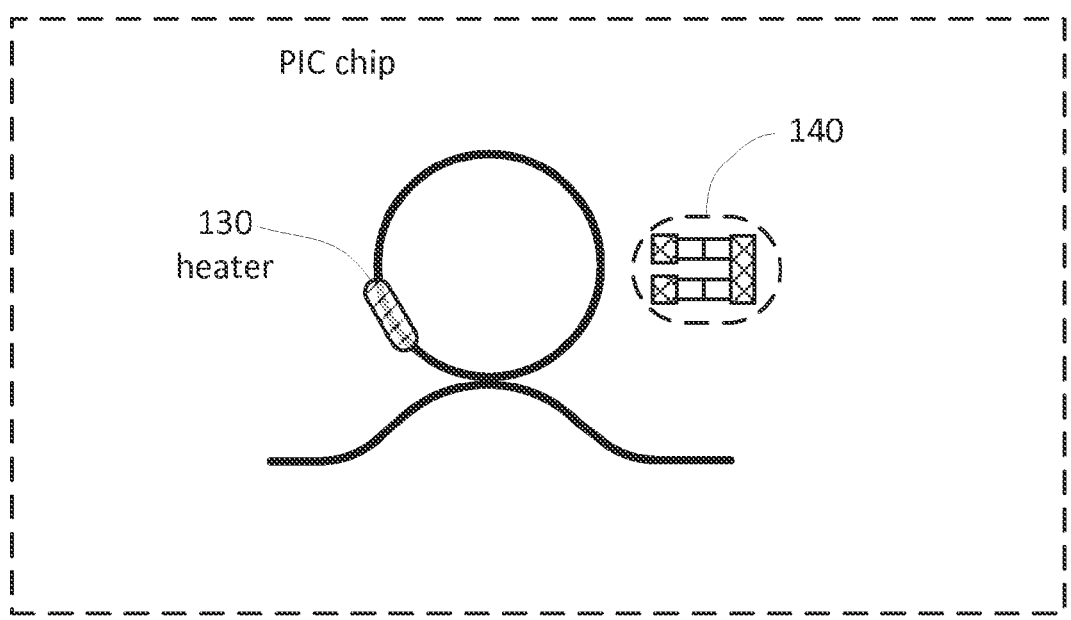
FIG. 7 is a schematic plan view of a PIC with an integrated bandgap temperature sensor located away from optical waveguides.

Referring back to FIG. 1, in embodiments wherein the heater 130 is present and turned on, local temperature may vary along the micro-ring optical waveguide 110, decreasing away from the heating element 132. Accordingly, the p/n junctions 141 may preferably be formed at a location relatively distant from the heating element 132 wherein their local temperature is indicative of an average temperature along the waveguide length of the micro-ring resonator 115, and is relatively less affected by localized heating near the heater location. In one embodiment the p/n junctions 141 of the temperature sensor 140 may be formed at a distance from the heating element 132 that is large enough so that in operation the temperature sensor 140 tracks a background temperature of the PIC 100 and is relatively less affected by the localized heating or temperature gradients that may exist close to the heating element 132. In one embodiment the p/n junctions 141 may be located outside the area of localized heating around the heating element 132, e.g. where the local temperature is within ~0.1° C. of the local temperature at a location along the waveguide 110 farthest from the heating element 132. For example, in some embodiments the p/n junctions 141 may be separated from the heating element 132 by a distance of about 10 μm or greater. In some embodiments, the first and second p/n junctions 141 and 142 may be formed at substantially the same distance from the heating element 132 to ensure their equal heating and temperature. In some embodiments, the p/n junctions 141 of the temperature sensor 140 may be located away from the micro-ring optical waveguide 110, as schematically illustrated in FIG. 7.

Figure 8:
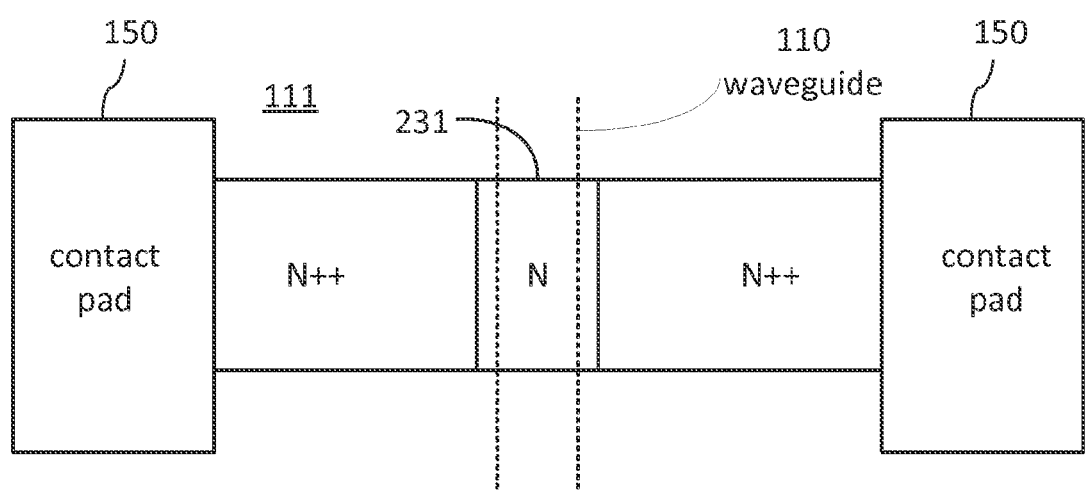
FIG. 8 is a schematic plan view of an example embodiment of a semiconductor resistive heater integrated with an optical waveguide.
Figure 9:
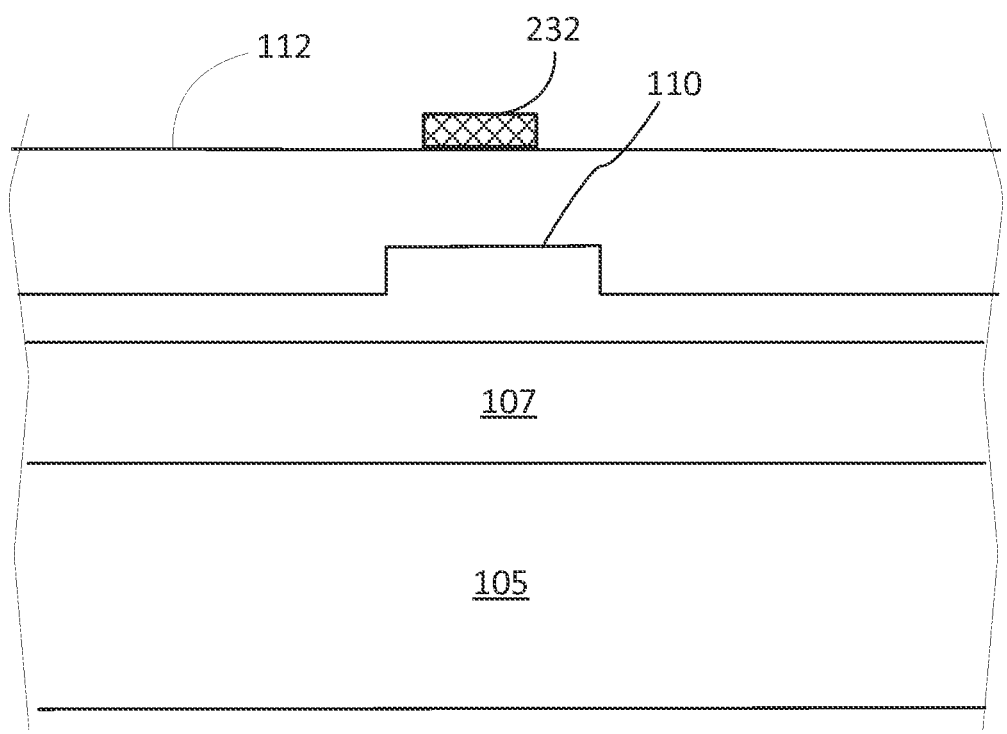
FIG. 9 is a schematic diagram representing a cross-section of the optical waveguide with an integrated metallic resistive heater.

The heating element 132 is preferably located at or close to the optical waveguide 110 to optimize the heat transfer to the optical waveguide 110 and reduce heating power requirements, and may be integrated therewith. With reference to FIG. 8, in one example embodiment the heating element 132 may be formed by a weakly doped portion 231 of the Si layer 111 within the optical waveguide 110; both n-doping and p-doping may be used. FIG. 9 illustrates another example embodiment wherein the heating element 132 may be in the form of a metallic resistive element 232, which may be disposed upon the cladding layer 112, preferably directly over the silicon waveguide 110 to maximize heat transfer to the waveguide.

Integrated bandgap temperature sensors of the type described hereinabove with reference to FIGS. 1, 4-7 may be used in semiconductor-based PICs that include one or more bus-coupled optical micro-ring resonators. Such PICs may be used in a variety of applications, including high-speed optical modulation and wavelength multiplexing/demultiplexing in telecommunication networks or optical interconnects, and in environmental sensing applications, among others. Such PICs may further include other integrated optical and/or electronic features or devices, such as additional optical waveguides and optical waveguide-based resonators, filters, couplers, etc, which may be present in addition to, or replacing the micro-ring of FIG. 1. Such PICs may also include additional p/n junctions performing functions that may or may not relate to temperature sensing.

Figure 10:
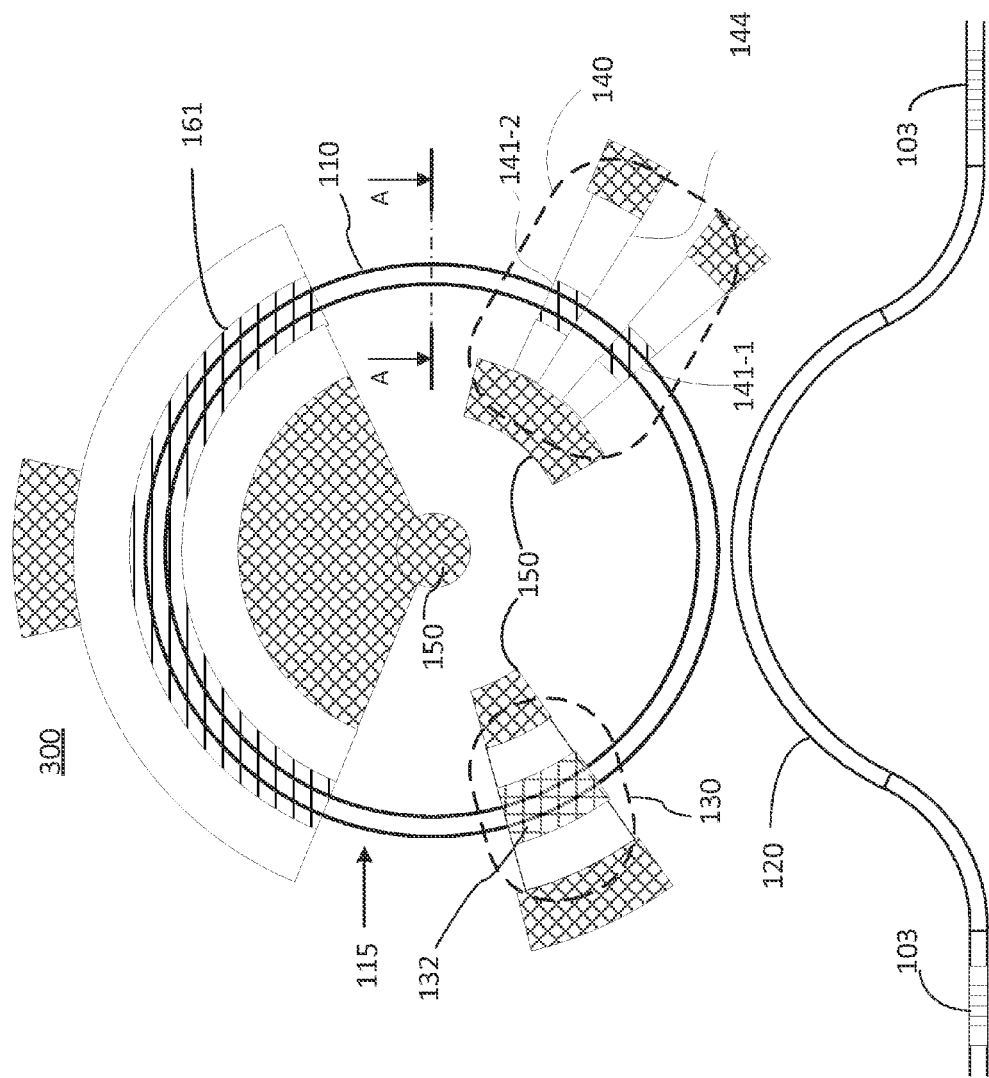
FIG. 10 is a schematic plan view diagram of a micro-ring waveguide modulator with the integrated bandgap temperature sensor and resistive heater.

With reference to FIG. 10, an example PIC 300 illustrated therein may be viewed as an embodiment of PIC 100 configured to operate as a high-speed optical modulator. PIC 300 differs from PIC 100 of FIG. 1 by the addition of a third p/n junction 161 integrated with the micro-ring waveguide 110. As illustrated, PIC 300 incorporates the bandwidth temperature sensor 140 and the heater 130 that have been described hereinabove with reference to PIC 100. The heater 130 may be omitted in embodiments not requiring active temperature stabilization. The third p/n junction 161 may be configured for modulating the refractive index of a portion of the micro-ring waveguide 110 by varying the width of the depletion layer associated with the p/n junction 161 when the p/n junction is reversed biased. In one embodiment, the p- and n-doped regions of the first, second, and third p/n junctions 141-1, 141-2, and 161 may be fabricated in the same steps to have substantially identical doping profiles. In other embodiments, the doping profiles of the first and second p/n junctions 141 of the temperature sensor 140 may differ from the doping profile of the third p/n junction 161. By applying a time-varying reverse bias voltage to the third p/n junction 161, the spectral position of the resonance peaks of the micro-ring resonator 115 may be modulated, resulting in an intensity modulation of light of corresponding wavelengths propagating between input and output ports 103 of the bus waveguide. By way of example, in a silicon micro-ring device wherein the third, or modulating, p/n junction 161 extends along about half of the circumference of the micro-ring 115 of 20 μm radius, the resonance dip in transmission in the 1550 nm wavelength range may be shifted in wavelength by about 20 pm when the reverse voltage applied to the third p/n junction 161 changes from 0 V to −1 V, corresponding to a wavelength tuning efficiency of the modulating p/n junction of ~20 pm/V. Further by way of example, such a device may have an analog modulation bandwidth of about 30 GHz, which is sufficiently broad to pass OOK (ON-OFF keying) data at 40 Gb/s.

Figure 11:
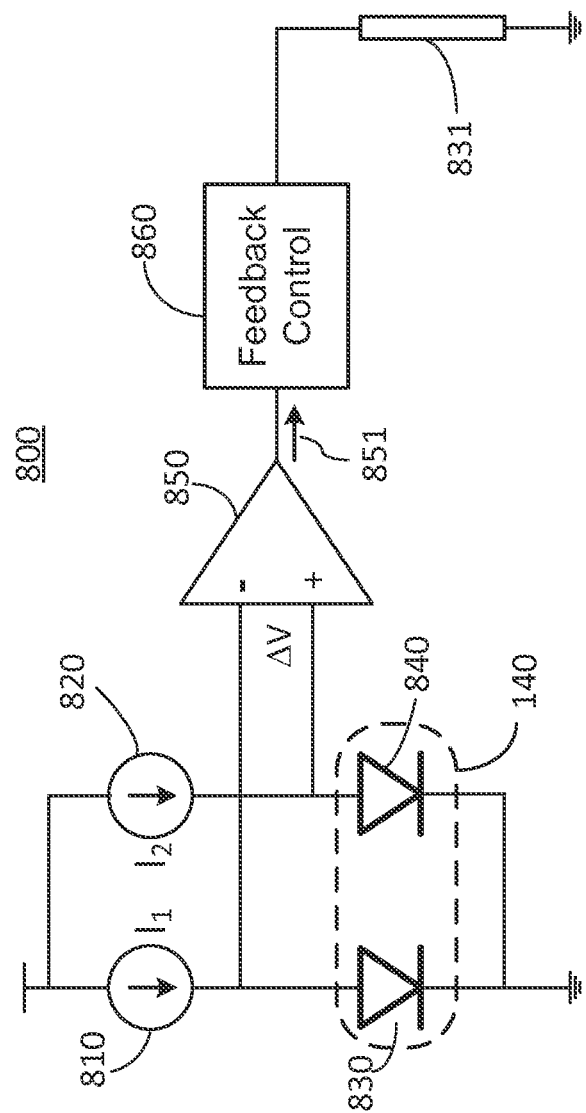
FIG. 11 is a schematic diagram of an electronic control circuit for PIC resonance stabilization using the matched p/n junctions as a bandgap temperature sensor.

With reference to FIG. 11, there is illustrated a schematic electrical circuit diagram of an example control circuit 800 that may be used for active automatic stabilization of PICs incorporating temperature control elements and bandgap temperature sensors based on dual p/n junctions, such as those illustrated in FIGS. 1 and 10. The control circuit 800 includes a feedback controller 860 in electrical communication with each of the temperature sensor 140 and a PIC temperature control element 831, which is shown as a resistor symbolizing the integrated heating element 132 of the resistive heater 130. The control circuit 800 is configured to drive the temperature control element in dependence upon the differential voltage signal ΔV produced by the temperature sensor 140 when supplied with junction currents $I_1$ and $I_2$. Here, diodes 830 and 840 represent the p/n junctions 141-1 and 141-2 of the temperature sensor 140. In one embodiment, p/n junctions 141-1 and 141-2 represented by diodes 830 and 840 may be matching p/n junctions. As illustrated, collectors of the diodes 830 and 840 are commonly connected to a ground, which represents common grounding of the correspondingly doped regions of the p/n junctions 141 in FIGS. 1, 5, and 10. Current sources 810 and 820 connect to the emitters of the diodes 830 and 840, respectively. In operation, they generate two different electrical currents $I_1$ and $I_2$ through the diodes 830 and 840, respectively. In another embodiment, for example wherein the p/n junctions 141-1 and 141-2 are of differing widths, a same electrical current may be passed through each of the diodes 830, 840. The control circuit 800 includes a comparator 850 having first and second input ports electrically coupled to the first and second p/n junctions represented by the diodes 830, 840. The comparator 850, which may be embodied as a differential amplifier, is configured to produce an electrical signal S 851 that is proportional to the differential voltage ΔV across the first and second p/n junctions 141 represented by the diodes 840 and 830. Accordingly, the output electrical signal S 851 from the comparator 850 may also be proportional to the PIC temperature T at the location of the p/n junctions' 141, i.e. S≅a·T, and may be referred to as the electrical temperature signal. In one embodiment, the differential voltage ΔV produced by the temperature sensor 140 at the inputs of the comparator 850 is indicative of an average temperature of the optical waveguide 110. In one embodiment, the differential amplifier 850 may be integrated in the same chip with the optical waveguide which temperature is being measured. The feedback controller 860 is configured to adjust the drive current of the resistive heater 831 based on the amplifier output signal S(T) 851 so as to maintain the waveguide temperature T at a desired value.

Figure 12:
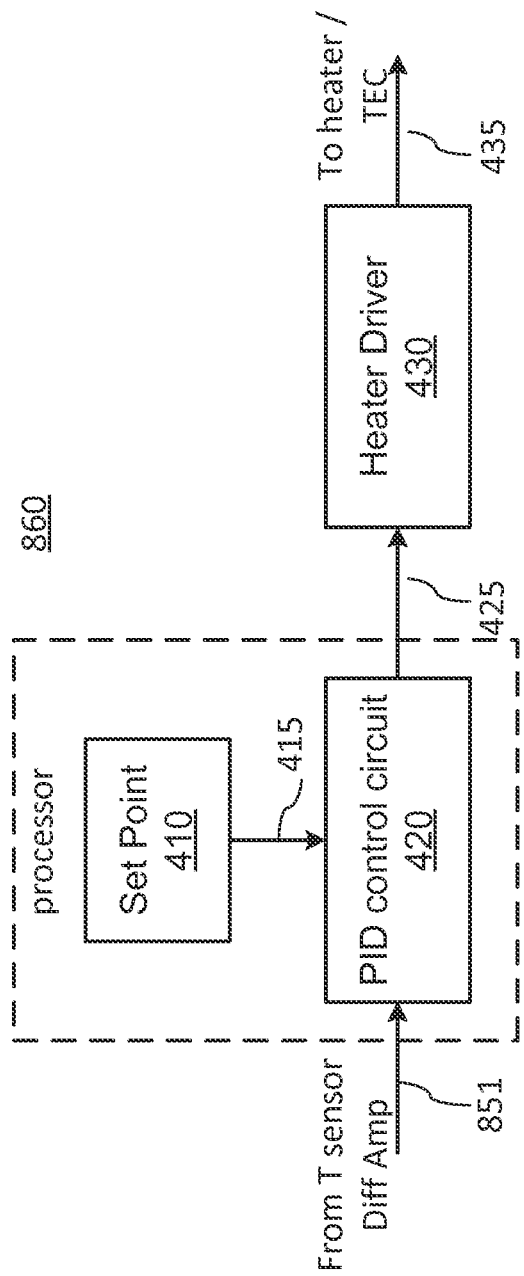
FIG. 12 is a schematic diagram of a feedback controller of the control circuit of FIG. 11.

With reference to FIG. 12, an example embodiment of the feedback controller 860 may include a proportional-integraldifferential (PID) control circuit 420 that is configured to generate an electrical temperature control signal 425 in response to a temperature error signal e. The temperature control signal 425 may then be provided to a heater driver 430 that is configured to regulate, responsive to the temperature control signal 452, an electrical signal 435 that drives the integrated heater 130 represented in FIG. 11 by the resistor 831. The temperature error signal e may be obtained by the feedback controller 860 comparing the electrical signal S 851 obtained from the comparator 850 to a set point signal 415 that defines a desired temperature of the PIC operation. In one embodiment, the set point signal 415 may be defined by a value $S_0$ provided by a set point circuit 410, and the error signal e may be proportional to a difference $(S-S_0)$. It will be appreciated that the PID controller 420 and the set-point circuit 410 may be implemented using either analog or digital circuitry. In an example embodiment, the PID controller 420 may be implemented using a digital processor, and the set point circuitry may be in the form of, or include, a memory register that may be read by the PID controller 420. By varying the set point value $S_0$ saved in the register, the micro-ring resonator in the PIC may be set to different temperatures, each of which corresponding to a different wavelength of operation. In one embodiment, the feedback controller 860 may maintain a lookup table relating a plurality of set point values $S_0$ to a plurality of wavelength values and/or a plurality of PIC temperature values, which may be obtained by calibration.

FIG. 13(B) illustrates the shift of the resonance wavelength of the micro-ring resonator versus heater voltage for an example embodiment of the bus-coupled micro-ring PIC device. The heater voltage measurements were performed on the same device as the chip temperature sensitivity measurements illustrated in FIG. 13(A). During the measurements which results are shown in FIG. 13(B) the wafer chuck was held at 25° C., and different voltages were applied onto the heater 130. The electrical resistance of the heating element 132, which was implemented as illustrated in FIG. 8, was measured to be 290 Ohm using an I-V sweep. As can be seen from FIG. 13(B), applying 4V to the heater 130 shifted the resonant wavelength of the micro-ring resonator by 4.44 nm, which is similar to the wavelength shift resulting from increasing the wafer chuck temperature from 25° C. to 80° C.

Figure 14:
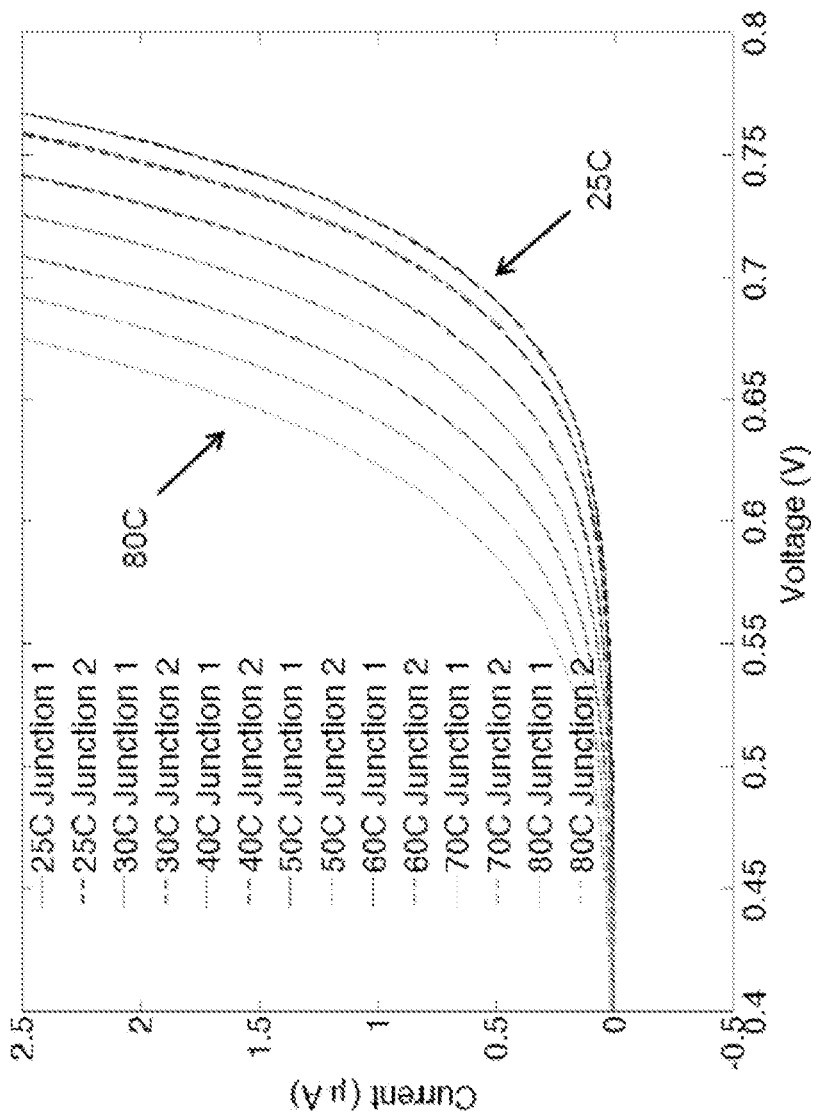
FIG. 14 is a graph illustrating the dependence of the current vs. voltage characteristic of one temperature sensing p/n junction of the integrated temperature sensor of a test micro-ring PIC.

FIG. 14 is a graph illustrating the current vs. voltage characteristics I(V) of two matched p/n junctions 141 of the test micro-ring PIC device at seven different temperatures in the range of 25° C. to 80° C., with a 5° C. temperature increment. The I(V) curves of one p/n junction are plotted using solid lines and the other with dashed lines. In this example embodiment, the p/n junctions each have a width of 2 μm and are spaced apart by a 3 μm wide gap of undoped Si layer. As can be seen from the figure, the I(V) curves of the two junctions substantially coincide at each temperature, showing almost perfect matching of the two p/n junctions. The figure also illustrates a monotonic response of the IV characteristic of the p/n junctions to temperature change.

Figure 15:
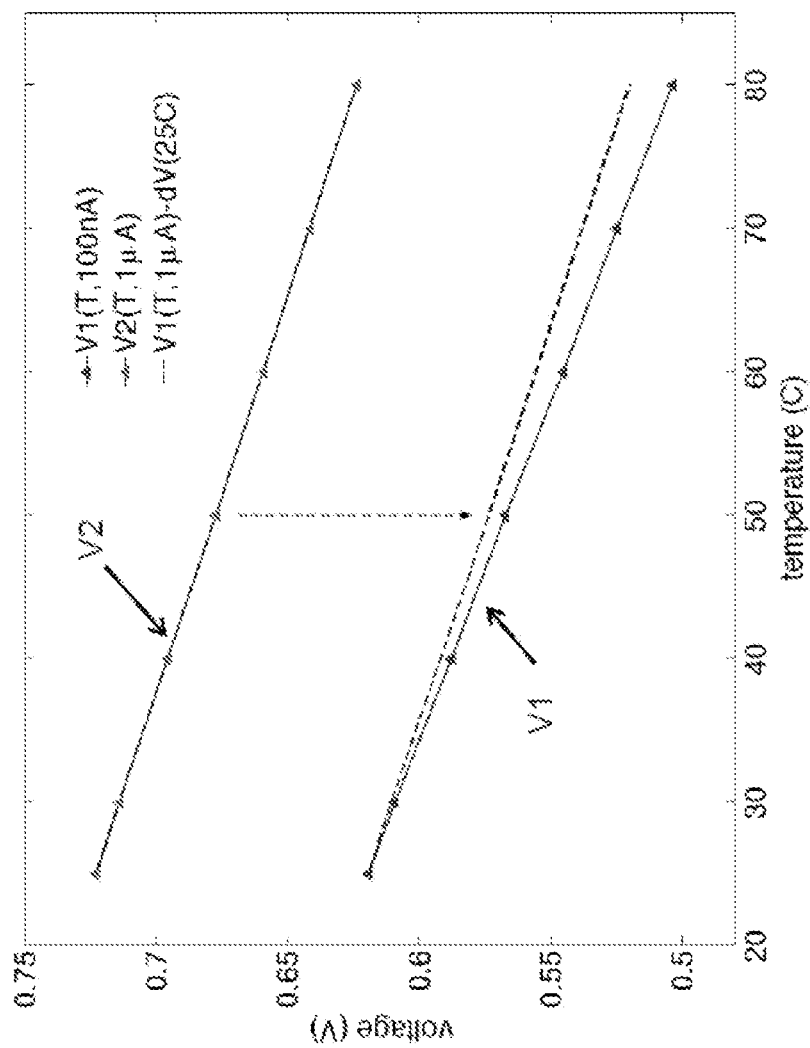
FIG. 15 is a graph illustrating the temperature dependence of the voltage across the temperature sensing p/n junction at two different junction currents.

FIG. 15 is a graph of the bias voltages V1 and V2 across the matched p/n junctions versus temperature for the test PIC device. One of the matched p/n junctions is connected to a current source of 0.1 μA producing the voltage denoted 'V1', and the other is connected to a current source of 100 nA producing the voltage denoted 'V2'. The dashed line represents V1(T,1 μA) minus the difference dV (25 C) between V1(25 C,1 μA) and V2(25 C,100 nA), illustrating the change in the differential voltage $\Delta V=(V2-V1)$ as the device temperature is increased. This change in the differential voltage may be measured by the control circuit of the PIC device, e.g. using the comparator/differential amplifier 850 of FIG. 11, to estimate the change in the device temperature.

Embodiments described hereinabove provide a method to thermally stabilize and/or wavelength tune a semiconductor PIC device, as exemplified hereinabove by the SOI PIC devices incorporating a silicon micro-ring resonator, and illustrate example semiconductor PIC devices that include integrated features enabling said control and stabilization. The method employs an integrated electrical heater to adjust and/or maintain the resonator temperature, and a temperature sensor comprised of a pair of p/n junctions, which may be conveniently formed as matched planar p/n junctions in the same semiconductor layer as the optical waveguides. In operation the p/n junctions of the temperature sensor may be driven at different currents and/or different current densities, and the difference in the resulting voltages across the p/n junctions are used as the temperature signal. An electrical control circuit connected to provide a feedback to the integrated heater from the dual p/n junctions of the temperature sensor may be used to stabilize relevant spectral features of the device, such as the resonant wavelengths of a micro-ring resonator, to a fixed user-selectable wavelength across a wide temperature range, and also to tune the relevant spectral feature to the desired wavelength within an operating wavelength range. The use of the forward-biased matched p/n junctions for sensing the device temperature and for generating the feedback signal for active temperature stabilization provides advantages over indirect methods of device temperature stabilization that rely on monitoring device performance parameters, such as the BER or an optical power. By directly sensing the device temperature at the PIC, the approach of the present disclosure provides a general and universal solution to the task of temperature stabilization of semiconductor-based PICs, which is independent of device functions. Furthermore, we found that the temperature and wavelength stabilization performance of the feedback control circuit providing the temperature and wavelength control may be considerably improved by using two matched p/n junctions for temperature sensing as described hereinabove as compared to a single forward-biased p/n junction, as the differential voltage from two matched p/n junctions provides a more reliable and less noisy temperature indicator than the voltage across a single forward-biased p/n junction.

The techniques outlined hereinabove for stabilizing an optical micro-ring resonator may be used to vary a temperature and/or a voltage bias so as to operate a semiconductor PIC device at a wavelength of interest, and to compensate for fabrication variability. Relevant thermal and electrical parameters can be determined by calibrating a PIC device using the sensing methods already described. Once the desired optical wavelength of operation is attained, one can record one or more parameters that can be used to operate the device at that wavelength in a non-transient machine readable memory, which can be one or more registers on a chip containing the PIC, or on an external memory such as a magnetic memory (for example, a hard drive), an optical memory (for example, a CD-ROM or DVD) or a semiconductor memory. One can then operate the micro-ring resonator or another phase-sensitive waveguide structure incorporated in the PIC device at the desired wavelength by recovering the at least one parameter and causing the temperature control to operate such that the optical waveguide structure operates under conditions corresponding to the at least one parameter. In other embodiments, the wavelength of operation can be adjusted over a range of wavelengths.

Although the stabilization technique and related devices and systems have been described hereinabove with reference to example PIC embodiments incorporating a silicon micro-ring resonator, it will be appreciated that the semiconductor PIC devices described hereinabove may incorporate additional optical waveguide structures, including but not limited to additional micro-ring resonators that in some embodiments may incorporate their own heating elements and/or their own temperature sensing p/n junctions. Furthermore, features and techniques described hereinabove may also be implemented in other types of semiconductor-based PIC devices, including but not limited to those incorporating semiconductor-based optical waveguide structures and integrated optical devices which operation relies on, and is sensitive to, the optical phase of the beam or beams propagating therein, including such optical interference structures or devices as a micro-disk resonator, a Mach-Zehnder interferometer, an arrayed waveguide grating (AWG), an Echelle grating, an optical hybrid, and a directional coupler; other examples of PIC elements to which the thermal stabilization technique described hereinabove may be applied include a waveguide thermal phase tuner and a waveguide delay line. All such PICs may be thermally stabilized substantially as described hereinabove, by incorporating therein one or more temperature control elements such as integrated resistive heaters 130, which may be for example of the type described hereinabove with reference to FIGS. 8 and 9, and further incorporating the bandgap temperature sensor of the type described hereinabove, which may be based for example on a pair of matched planar p/n junctions 141, which may be formed in the same semiconductor layer as the optical waveguide(s) forming the optical phase sensitive interference structures of the PIC device. Examples of such PICs are illustrated in FIGS. 20 and 21.

Figure 16:
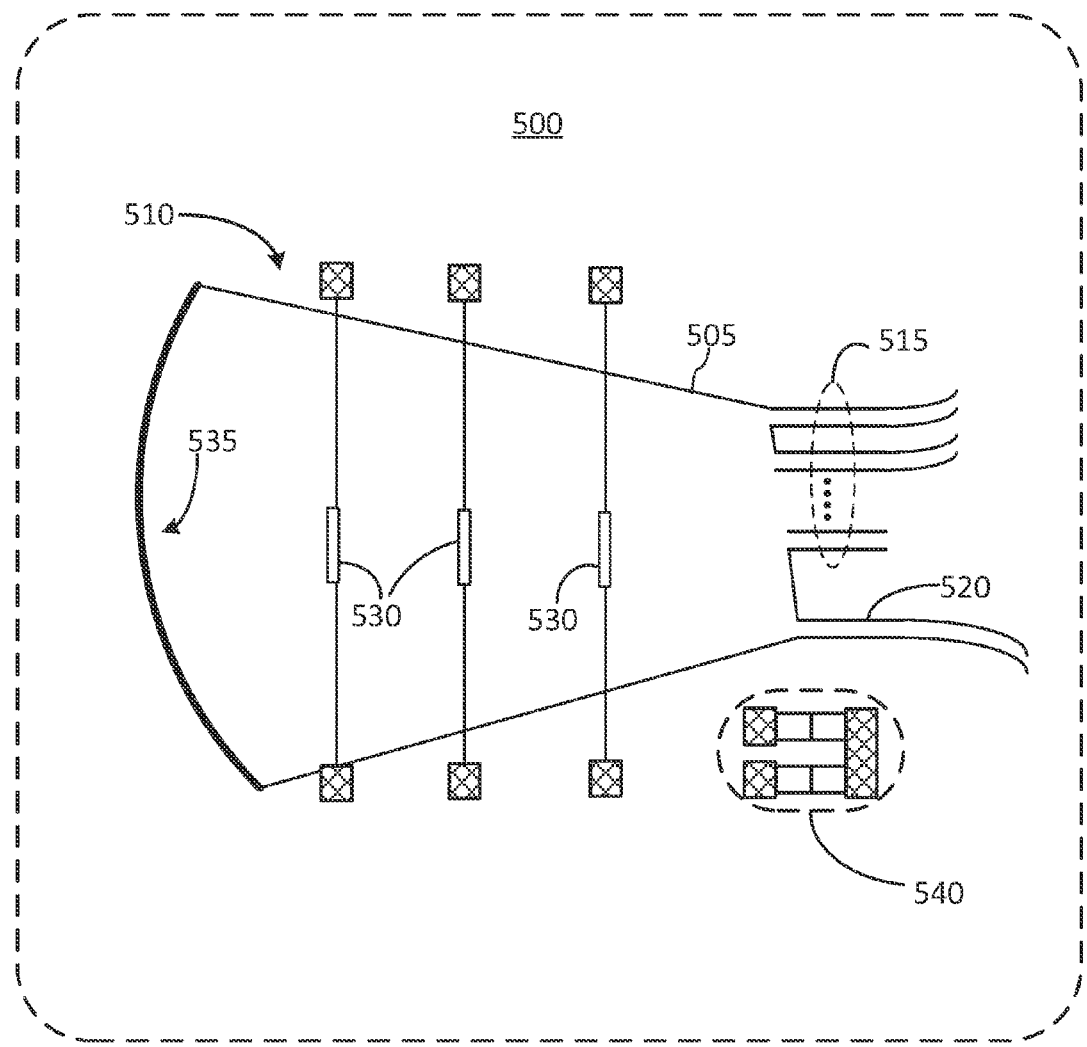
FIG. 16 is a schematic diagram of an example PIC including an Echelle grating with integrated heaters and bandgap temperature sensor.

With reference to FIG. 16, there is illustrated an example PIC 500 including an integrated optical device in the form of an Echelle grating 510, which may be formed in a semiconductor layer of a wafer as known in the art. The semiconductor layer in which the Echelle grating 510 is formed may be for example a silicon layer of a SOI wafer as described hereinabove, but may also be a layer of a different semiconductor material. The Echelle grating 510 may include a number of input waveguides 515 and an output waveguide 520 connecting to a suitably shaped slab waveguide 505 at an end thereof opposite to a profile grating 535, and may operate as an optical demultiplexer. To enable thermal stabilization and wavelength control of the device, PIC 500 may further include one or more resistive heaters 530 that may be integrated into a slab waveguide portion 505 of the Echelle grating 510, and a temperature sensor 540, which may include matched p/n junctions as described hereinabove with reference to PICs 100 and 300 and FIGS. 1, 5, and 6. The matched p/n junctions of the temperature sensor 540 may be formed within the same semiconductor layer as the Echelle grating 510, and may be disposed away from the heater or heaters 530, for example at some distance from the slab waveguide of the Echelle grating 510, or next to it. In another embodiment, the p/n junctions of the temperature sensor 540 may be integrated with the slab waveguide of the Echelle grating. The heaters 530 may be evenly spread across the slab waveguide of the Echelle grating.

Figure 17:
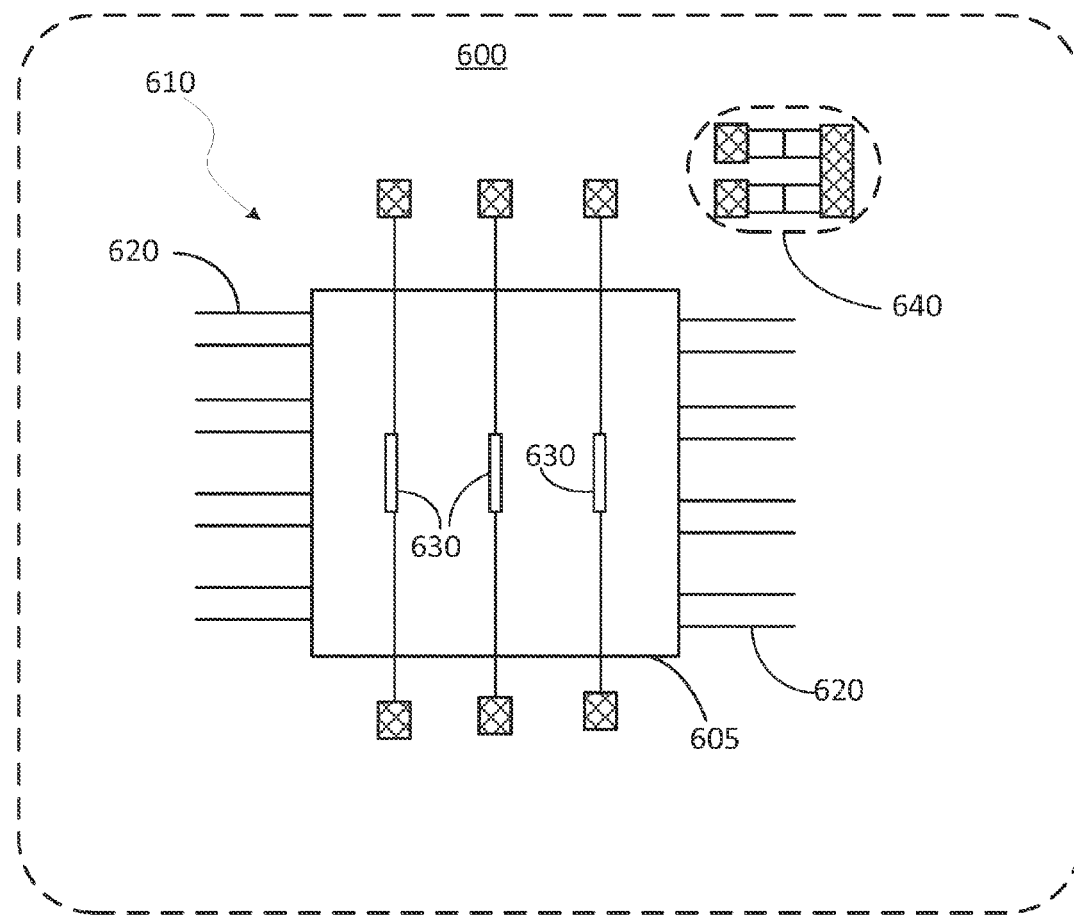
FIG. 17 is a schematic diagram of an example PIC including a 4×4 MMI coupler with integrated heaters and bandgap temperature sensor.

Referring to FIG. 17, there is illustrated an example PIC 600 including a 4×4 multi-mode interference (MMI) coupler 610 that may be formed in a semiconductor layer of a wafer as known in the art. The semiconductor layer in which the MMI coupler 610 is formed may be for example a silicon layer of a SOI wafer as described hereinabove, but may also be a layer of a different semiconductor material. As illustrated, the MMI coupler 610 is a 4×4 coupler that includes four input and four output waveguide ports 620, but in other embodiments if may include a different number of input and/or output waveguide ports. In the 4×4 implementation, the MMI coupler 610 may be configured to operate as an optical hybrid. Generally, the operation of the MMI coupler is sensitive to optical phases of input beams within the MMI region, and is therefore sensitive to temperature. To enable thermal stabilization and wavelength control of the device, PIC 600 may further include one or more resistive heaters 630 that may be integrated into a slab waveguide 605 forming the MMI 610, and a temperature sensor 640 based on dual p/n junctions, which may be generally as described hereinabove with reference to PICs 100, 300 and 500. The p/n junctions of the temperature sensor 640 may be formed within the same semiconductor layer as the MMI coupler 610, and may be disposed away from the heater or heaters 630, for example at some distance from the slab waveguide of the MMI 610, or next to it. In another embodiment, the p/n junctions of the temperature sensor 640 may be integrated with the slab waveguide of the MMI coupler. The heaters 630 may be evenly spread across the MMI cavity.

Although each of the example integrated semiconductor PICs described hereinabove include an integrated resistive heater to facilitate active PIC temperature control that is suitably fast and energy efficient, other embodiments may provide integrated semiconductor PICs that include at least one optical waveguide and an integrated temperature sensor that is based on a pair of matched p/n junctions as described hereinabove, but which may be absent of integrated resistive heaters. In some embodiments, other temperature control elements, such as for example a TEC, may be used instead of the resistive heaters; in such embodiments, the active feedback control and temperature stabilization as described hereinabove using the feedback control circuit of FIGS. 13 and 14, or similar, may still be used, with the output signal of the feedback controller configured for controlling the TEC. In other embodiments the differential voltage obtained from the two matched p/n junctions of the integrated temperature sensor may be used to calibrate an output signal from the PIC device without being used in an active feedback control of the device temperature. Examples of such embodiments wherein the integrated temperature sensor of the present disclosure may be useful in the absence of integrated heaters include, but are not limited to, chemical and bio-chemical sensors based on silicon micro-ring waveguides that are coated with a cladding material which optical properties are sensitive to a target chemical or another environmental agent. An example of such sensor, which incorporates two silicon micro-rings, is described in an article "Electrical tracing-assisted dual-microring label-free optical bio/chemical sensors," by J. Song et al, Optics Express 2012, Vol. 20, No. 4, which is incorporated herein by reference. By integrating the dual p/n junction temperature sensor as described hereinabove into or near a sensing micro-ring of the optical bio/chemical sensor of J. Song et al, the current temperature of the sensing micro-ring may be measured and recorded, for example using a differential amplifier connected to the temperature sensor as described hereinabove with reference to FIG. 11, and the micro-ring temperature sensitivity could be calibrated out based on the recorded temperature sensor output, enabling more accurate measurements in an environment which is not temperature stable.

Advantageously, the matched p/n junctions of the present disclosure may be fabricated using well-established semiconductor fabrication processes and technologies. In one embodiment, the process of fabricating a semiconductor PIC incorporating a bandgap temperature sensor of the type described hereinabove may include the following two general steps or processes: a) patterning a semiconductor layer on a substrate to define at least one optical waveguide or an integrated optical device, and b) forming the integrated bandgap temperature sensor by selectively doping the semiconductor layer at a desired location of the temperature sensor. The semiconductor layer may be, for example, the silicon layer 111 disposed over the oxide layer 107 of a SOI wafer 170, as illustrated in FIG. 2, but may be also a layer of a different semiconductor material. Step or process (b) may in turn include the following steps or sub-processes: c) selectively doping the semiconductor layer to define first and second conducting regions of a first carrier polarity; d) selectively doping the semiconductor layer adjacent to the first and second conducting regions to define third and fourth conducting regions of a second carrier polarity that is opposite to the first carrier polarity, and so as to define first and second p/n junctions that in one embodiment may have substantially identical or matching current density vs. voltage characteristics; and, e) forming electrical contacts to the first and second p/n junctions, for example so that the p/n junctions share a common electrical connection at p-doped sides or n-doped sides thereof. The electrical contacts may be configured to direct a first electrical current through the first p/n junction, and to direct a second electrical current through the second p/n junction. The term 'semiconductor region of the first carrier polarity" may refer to a p-doped region, in which case the term 'semiconductor region of the second carrier polarity" refers to an n-doped region. The term 'semiconductor region of the first carrier polarity" may also refer to an n-doped region, in which case the term 'semiconductor region of the second carrier polarity" refers to a p-doped region.

In one embodiment, the method may further include forming an electrical heater integrated with the at least one optical waveguide.

In one embodiment, step (c) of the method may further include selectively doping the semiconductor layer to define a fifth conducting region of the first carrier polarity, and step (d) includes selectively doping the semiconductor layer to define a sixth conducting region of the second carrier polarity adjacent to the fifth conducting region, wherein the fifth and sixth conducting regions are configured to define a third p/n junction configured to modulate the at least one optical waveguide. The third p/n junction may be configured, for example, to modulate the refractive index of the optical waveguide by modulating the width of the depletion region of the third p/n junction by varying a reverse bias voltage applied to the junction.

In one embodiment, the first, second, and fifth conducting regions may be formed in a same first doping step, for example by ion implantation or diffusion of suitable dopants of a first kind that is known to produce the first carrier polarity, and the third, fourth, and sixth conducting regions are formed in a same second doping step, for example by ion implantation or diffusion of suitable dopants of a second kind to produce the first carrier polarity.

Further details relating to methods of designing and fabricating devices having elements similar to those described herein are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example, it will be appreciated that semiconductor materials other than silicon, including but not limited to compound semiconductor materials such as GaAs, InP, and their alloys, may be used to fabricate PICs with the integrated bandgap temperature sensors and optional resistive heaters of the types described hereinabove. In another example, the optical waveguide 110 may form, or be a portion of, an optical structure other than a micro-ring. In another example, the p/n junctions 141 forming the bandgap sensor 140 may differ from each other in their material structure, doping profiles and/or geometry, resulting in non-matching V(I) and/or V(J) characteristic, and the device temperature information may be recovered using off-chip processing of their respective voltages or electrical currents. Furthermore, an integrated multi junction bandgap temperature sensor of the type described hereinabove may be used in a PIC to sense the temperature of an optical device other than a waveguide, such as for example a non-waveguide resonator which may be integrated within the PIC.

Furthermore, although the theoretical description that may be given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Furthermore any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A device comprising:
a semiconductor photonic integrated circuit (PIC) comprising:
at least one integrated optical device comprising an optical resonator;
a temperature sensor comprising first and second p/n junctions integrated with the optical resonator, wherein the first and second p/n junctions are operable to produce one or more electrical signals that are indicative of a temperature of the optical resonator; and
a temperature control element integrated with the optical resonator, the temperature control element operable to adjust the temperature of the optical resonator responsive to an electrical temperature control signal,
wherein the first and second p/n junctions are spaced from the temperature control element by at least 10 microns so as to lessen effects of local thermal gradients near the temperature control element on said p/n junctions.

2. The device of claim 1 wherein the first and second p/n junctions are disposed away from the temperature control element at a device location wherein the local temperature is within 0.1 C of a local temperature at a location in the optical resonator that is farthest from the temperature control element over an operating temperature range specified for the PIC.

3. The device of claim 1, wherein the optical resonator comprises a micro-ring resonator.

4. The device of claim 1, wherein the optical resonator comprises a micro-disk resonator.

5. The device of claim 1 comprising a substrate including a dielectric layer, wherein:
the optical resonator comprises a patterned semiconductor layer disposed over the dielectric layer, and
the first and second p/n junctions are planar p/n junctions each comprising a p-doped region of the patterned semiconductor layer abutting an n-doped region thereof.

6. The device of claim 5, comprising a direct electrical connection between either the p-doped regions of the first and second p/n junctions or the n-doped region of the first and second p/n junctions.

7. The device of claim 5, wherein the first and second p/n junctions are configured to have matching current density vs. voltage characteristics.

8. The device of claim 5, wherein the optical resonator comprises at least one optical waveguide, and wherein first and second p/n junctions are integrated with the at least one optical waveguide.

9. The device of claim 5, wherein the first and second p/n junctions are spaced apart from the at least one integrated optical device.

10. The device of claim 2, wherein the temperature control element comprises a resistive heater integrated with the at least one integrated optical device.

11. The device of claim 10, wherein the resistive heater comprises a metal element disposed over the at least one integrated optical device.

12. The device of claim 10, wherein the at least one integrated optical device comprises at least one optical waveguide, and the resistive heater comprises a doped portion of the at least one optical waveguide that is configured to heat the at least one optical waveguide by passing electrical current therethrough.

13. The device of claim 1, wherein the first p/n junction is matched in size with the second p/n junction.

14. The device of claim 1 wherein the at least one integrated optical device comprises an optical waveguide, further comprising a third p/n junction that is integrated with the optical waveguide and configured for modulating the refractive index of said optical waveguide.

15. The device of claim 2, further comprising a control circuit in electrical communication with each of the temperature sensor and the temperature control element, the control circuit configured to drive the temperature control element in dependence upon the one or more electrical signals obtained from the temperature sensor.

16. The device of claim 15, wherein the control circuit includes a comparator comprising first and second input ports electrically coupled to the first and second p/n junctions and configured to produce a differential electrical signal proportional to a difference in voltages across the first and second p/n junctions.

* * * * *